US010285425B2

(12) United States Patent
Shi

(10) Patent No.: US 10,285,425 B2
(45) Date of Patent: *May 14, 2019

(54) REBAUDIOSIDE A AND STEVIOSIDE COMPOSITIONS

(71) Applicant: EPC NATURAL PRODUCTS CO., LTD., Beijing (CN)

(72) Inventor: Jingang Shi, Beijing (CN)

(73) Assignee: EPC NATURAL PRODUCTS CO. LTD, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/340,729

(22) Filed: Jul. 25, 2014

(65) Prior Publication Data

US 2014/0335263 A1  Nov. 13, 2014

Related U.S. Application Data

(63) Continuation of application No. 13/214,397, filed on Aug. 22, 2011, now Pat. No. 9,578,895.

(60) Provisional application No. 61/376,005, filed on Aug. 23, 2010.

(51) Int. Cl.
*A23L 27/10* (2016.01)
*A23L 27/30* (2016.01)
*A23L 2/60* (2006.01)

(52) U.S. Cl.
CPC .............. *A23L 27/36* (2016.08); *A23L 2/60* (2013.01); *A23L 27/33* (2016.08); *A23V 2002/00* (2013.01)

(58) Field of Classification Search
CPC ......... A23L 1/236; A23L 1/2366; A23L 27/36
USPC ...................................................... 426/658
See application file for complete search history.

(56) References Cited

U.S. PATENT DOCUMENTS

| | | |
|---|---|---|
| 3,529,602 A | 9/1970 | Hind et al. |
| 3,703,177 A | 11/1972 | Hind et al. |
| 4,082,858 A | 4/1978 | Morita et al. |
| 4,353,889 A | 10/1982 | DuBois |
| 4,361,697 A | 11/1982 | Dobberstein et al. |
| 4,612,942 A | 9/1986 | Dobberstein et al. |
| 4,892,938 A | 1/1990 | Giovanetto |
| 5,112,610 A | 5/1992 | Kienle |
| 5,962,678 A | 10/1999 | Payzant et al. |
| 5,972,120 A | 10/1999 | Kutowy et al. |
| 6,096,870 A | 8/2000 | Mozaffar et al. |
| 7,238,379 B2 | 7/2007 | Lang |
| 7,923,552 B2 | 4/2011 | Jackson et al. |
| PP22,593 P3 | 3/2012 | Garnighian |
| 8,153,563 B2 | 4/2012 | Morgan et al. |
| 8,257,948 B1 | 9/2012 | Markosyan |
| PP23,164 P3 | 11/2012 | Alvarez Britos |
| 8,318,459 B2 | 11/2012 | Markosyan |
| 8,367,138 B2 | 2/2013 | Prakash et al. |
| 2003/0138538 A1 | 7/2003 | Kitazume et al. |
| 2003/0139610 A1 | 7/2003 | Khare et al. |
| 2006/0083838 A1 | 4/2006 | Jackson et al. |
| 2006/0134292 A1 | 6/2006 | Abelyan et al. |
| 2006/0142555 A1 | 6/2006 | Jonnala et al. |
| 2007/0003679 A1 | 1/2007 | Shimizu et al. |
| 2007/0082103 A1 | 4/2007 | Magomet et al. |
| 2007/0116823 A1 | 5/2007 | Prakash et al. |
| 2007/0116835 A1 | 5/2007 | Prakash et al. |
| 2007/0128311 A1 | 6/2007 | Prakash et al. |
| 2007/0292582 A1 | 12/2007 | Prakash et al. |
| 2008/0026111 A1 | 1/2008 | Bellody et al. |
| 2008/0300402 A1 | 12/2008 | Yang et al. |
| 2010/0099857 A1 | 4/2010 | Evans |
| 2010/0112156 A1 | 5/2010 | Abelyan et al. |
| 2010/0137569 A1 | 6/2010 | Prakash et al. |
| 2010/0316782 A1 | 12/2010 | Shi et al. |
| 2011/0092684 A1* | 4/2011 | Abelyan ................ C07H 15/24 536/18.1 |
| 2011/0195161 A1 | 8/2011 | Upreti et al. |
| 2012/0058236 A1 | 3/2012 | Fosdick et al. |
| 2012/0058247 A1 | 3/2012 | Shi |
| 2012/0090062 P1 | 4/2012 | Alvarez Britos |
| 2012/0090063 P1 | 4/2012 | Alvarez Britos |
| 2012/0184500 A1 | 7/2012 | Goralczyk et al. |
| 2012/0214751 A1 | 8/2012 | Markosyan |
| 2012/0214752 A1 | 8/2012 | Markosyan |
| 2012/0269954 A1 | 10/2012 | Bridges et al. |
| 2012/0282389 A1 | 11/2012 | Purkayastha et al. |
| 2012/0301589 A1 | 11/2012 | Markosyan |
| 2013/0071537 A1 | 3/2013 | Shi et al. |
| 2013/0274351 A1 | 10/2013 | Markosyan et al. |

FOREIGN PATENT DOCUMENTS

| | | |
|---|---|---|
| AU | 2004/202670 | 1/2005 |
| CA | 2 185 496 | 3/1998 |
| CN | 1192447 | 9/1998 |

(Continued)

OTHER PUBLICATIONS

Abou-Arab, et al., "Physico-chemical assessment of natural sweeteners steviosides produced from stevia rebaudiana bertoni plant", African J. Food Sci., May 2010, vol. 4, No. 5, pp. 269-281.
Brandle, et al., "Steviol glycoside biosynthesis", Phytochemistry. 2007, No. 68(14), pp. 1855-1863.
Crammer, B. and Ikan, R. "Progress in the chemistry and properties of rebaudiosides," In Developments in Sweeteners-3, T.H. Grenby (ed), Elsevier Applied Science, London, pp. 45-64 (1987).
Serajuddin, "Salt Formation to Improve Drug Solubility", Advance Drug Delivery Reviews, No. 59, 2007, pp. 603-616.
Shibata, et al. Glucosylation of Steviol and Steviol-Glucosides in Extracts from Stevia rebaudiana Bertoni, Plant Physiol. 1991, vol. 95, pp. 152-156.

(Continued)

*Primary Examiner* — Jeffrey P Mornhinweg
(74) *Attorney, Agent, or Firm* — Michael Ye; Morris, Manning & Martin, LLP

(57) ABSTRACT

The invention describes *stevia* compositions that are devoid of or have minimal concentrations of rebaudioside C and/or dulcoside A to decrease the aftertaste associated with *stevia* compositions.

20 Claims, No Drawings

(56) References Cited

FOREIGN PATENT DOCUMENTS

| | | |
|---|---|---|
| CN | 1238341 | 12/1999 |
| CN | 1243835 | 2/2000 |
| CN | 101220062 | 7/2001 |
| CN | 1078217 C | 1/2002 |
| CN | 1535607 | 10/2004 |
| CN | 101062078 | 10/2007 |
| CN | 101200480 | 6/2008 |
| CN | 101330833 | 12/2008 |
| CN | 101472487 | 7/2009 |
| CN | 101662955 | 3/2010 |
| CN | 101801177 | 8/2010 |
| CN | 101854814 | 10/2010 |
| EP | 2 215 914 | 8/2010 |
| EP | 2 415 358 | 2/2012 |
| EP | 2 428 123 | 3/2012 |
| EP | 2 456 450 | 5/2012 |
| EP | 2 457 450 | 5/2012 |
| EP | 2 460 419 | 6/2012 |
| EP | 2 486 806 | 8/2012 |
| FR | 2 968 170 | 6/2012 |
| JP | 52-023100 | 2/1977 |
| JP | 52-062300 | 5/1977 |
| JP | 54-041898 | 4/1979 |
| JP | 54-041899 | 4/1979 |
| JP | 54-041900 | 4/1979 |
| JP | 55-092400 | 7/1980 |
| JP | 56-121453 | 9/1981 |
| JP | 56-121454 | 9/1981 |
| JP | 56-121455 | 9/1981 |
| JP | 57-086264 | 5/1982 |
| JP | 58-101660 | 6/1983 |
| JP | 59120073 | 11/1984 |
| JP | 62-146599 | 6/1987 |
| JP | 63-173531 | 7/1988 |
| JP | 2-261359 | 10/1990 |
| JP | 6-192283 | 7/1994 |
| JP | 7-143860 | 6/1995 |
| JP | 7-177862 | 7/1995 |
| JP | 08-000214 | 1/1996 |
| JP | 08-325156 | 10/1996 |
| JP | 11-243906 | 9/1999 |
| JP | 2002-45145 | 2/2002 |
| JP | 2002-262822 | 9/2002 |
| JP | 2004-344071 | 12/2004 |
| JP | 2012-005483 | 1/2012 |
| JP | 2012-090629 | 5/2012 |
| KR | 1996-0016568 | 12/1996 |
| KR | 2004-0026747 | 4/2004 |
| WO | WO 00/49895 | 8/2000 |
| WO | WO 2003/003994 | 1/2003 |
| WO | WO 03-033097 | 4/2003 |
| WO | WO 06-038221 | 4/2006 |
| WO | WO 06-045023 | 4/2006 |
| WO | WO 06-072921 | 7/2006 |
| WO | WO 2006095366 | 9/2006 |
| WO | WO 2007/061810 | 5/2007 |
| WO | WO 2007/061898 A1 | 5/2007 |
| WO | WO 2008/057968 | 5/2008 |
| WO | WO 2008/091547 | 7/2008 |
| WO | WO 2008/147725 | 12/2008 |
| WO | WO2009/071277 A1 * 6/2009 ........... A23K 1/1643 | |
| WO | WO 2009/086049 A2 | 7/2009 |
| WO | WO 2009/140394 A1 | 11/2009 |
| WO | WO 2010/150930 | 12/2010 |
| WO | WO 2011/059954 | 5/2011 |
| WO | WO 2011/094423 | 8/2011 |
| WO | WO 2011/161027 | 12/2011 |
| WO | WO 2012/031879 | 3/2012 |
| WO | WO 2012/006742 | 5/2012 |
| WO | WO 2012/057575 | 5/2012 |
| WO | WO 2012/068457 | 5/2012 |
| WO | WO 2012/073121 A2 | 6/2012 |
| WO | WO 2012/082677 | 6/2012 |
| WO | WO 2012/089861 | 7/2012 |
| WO | WO 2012/102769 | 8/2012 |
| WO | WO 2012/108894 | 8/2012 |
| WO | WO 2012/109506 | 8/2012 |
| WO | WO 2012/109585 | 8/2012 |
| WO | WO 2012/112177 | 8/2012 |
| WO | WO 2012/112180 | 8/2012 |
| WO | WO 2012/134502 | 10/2012 |
| WO | WO 2012/153339 | 11/2012 |
| WO | WO 2012/166163 | 12/2012 |
| WO | WO 2012/166164 | 12/2012 |
| WO | WO 2013/036366 | 3/2013 |
| WO | WO 2013/123281 | 8/2013 |

OTHER PUBLICATIONS

Upreti, et al. "Solubility Enhancement of Steviol Glycosides and Characterization of Their Inclusion Complex with Gamma-Cyclodextrin", Int. J. Mol. Sci. Nov. 2011, vol. 12, pp. 7259-7553.
International Search Report from related PCT Application PCT/IB2011/002636, dated Apr. 12, 2012, 3 pages.
International Search Report from PCT/US2012/029613, dated Feb 1, 2013, 3 pages.
International Preliminary Report on Patentability from related PCT Application PCT/IB2011/002636, dated Feb. 26, 2013, 5 pages.
International Search Report from PCT/US2008/000700, dated Jul. 31, 2008, 5 pages.
International Search Report from PCT/IB2010/003045, dated May 5, 2011, 4 pages.
International Search Report and Written Opinion from PCT/IB2011/003351, dated Jul. 26, 2012, 5 pages.
International Search Report and Written Opinion from PCT/IB2010/001636, dated Dec. 2, 2010, 4 pages.
Extended European Search Report from related PCT Application PCT/IB2010/003045, dated May 6, 2013, 5 pages.
Extended European Search Report from related European Application No. 10789086.5, dated Jun. 6, 2014, 12 pages.
Extended European Search Report from related European Application No. 12756924.2, dated Feb. 6, 2015, 6 pages.
Extended European Search Report from related European Application No. 11844323.3, dated Feb. 11, 2015, 8 pages.
Makapugay, et al., "Improved high-performance liquid chromatographic separation of the Stevia rebaudiana sweet diterpene glycosides using linear gradient elution", Journal of Chromatography, No. 283, 1984, pp. 390-395.
Prakash, et al., "Development of rebiana, a natural, non-caloric sweetener", Food and Chemical Toxicology, No. 46(7), 2008, pp. S75-S82.
International Search Report and Written Opinion from PCT/IB2015/053685, dated Sep. 24, 2015, 14 pages.
Kasai, et al., "Synthesis of Sweet Diterpene-Glycoside of Leaves of Stevia: rebaudiosides-A, -D, -E and their relating glycosides as well as Relationship between their Sweetness and Chemical Structure", Journal of Chemical Society of Japan, No. 5, 1981, pp. 726-735.
Kinghorn, et al., "Studies to Identify, Isolate, Develop and test Naturally Occurring Noncariogenic Sweeteners that May be Used as Dietary Sucrose Substitutes", Government Reports and Announcements Index, United States, Chemical Abstracts, 1985, 35 pages.
Kolb, et al., "Analysis of Sweet Diterpene Glycosides from Stevia rebaudiana: Improved HPLC Method", Journal of Agricultural Food Chemistry, vol. 49, 2001, pp. 4538-4541.
Ohtani, et al., "Methods to Improve the Taste of the Sweet Principles of Stevia Rebaudiana", Stevia, The Genus Stevia, Edited by A. Douglas Kinghorn, CRC Press, Print ISBN 978-0-415-26830-1, 2001, pp. 138-159.
Sharma, et al., "Chemistry and in vivo profile of ent-kaurene glycosides of Stevia rebaudianna Bertoni—An Overview", Natural Product Radiance, vol. 8(2), 2009, pp. 181-189.
Tanaka, "Improvement of Taste of Natural Sweeteners", Pure & Appl. Chem., vol. 69, No. 4, 1997, pp. 675-683.

* cited by examiner

REBAUDIOSIDE A AND STEVIOSIDE COMPOSITIONS

CROSS REFERENCE TO RELATED APPLICATIONS

This application is a continuation of application Ser. No. 13/214,397, filed Aug. 22, 2011, which claims benefit under 35 U.S.C. § 119(e) to U.S. Provisional Patent Application Serial No. Appln. No. 61/376,005, filed Aug. 23, 2010, the contents of which is incorporated herein by reference in its entirety.

FIELD OF THE INVENTION

The present invention discloses *stevia* compositions that have reduced amounts of rebaudioside C (RC) and/or dulcoside A (DA). Decreased amounts or elimination of rebaudioside C and/or dulcoside A reduces or eliminates the after taste associated with *stevia* compositions.

BACKGROUND OF THE INVENTION

*Stevia* is a genus of about 240 species of herbs and shrubs in the sunflower family (Asteraceae), native to subtropical and tropical South America and Central America.

The species *Stevia rebaudiana* Bertoni, commonly known as sweet leaf, sugarleaf, or simply *stevia*, is widely grown for its sweet leaves. The leaves have traditionally been used as a sweetener. Steviosides and rebaudiosides are the major constituents of glycosides found in the leaves of the *stevia* plant.

Over 100 phytochemicals have been discovered in *stevia*. It is rich in terpenes and flavonoids. Of these eight glycosides, stevioside is considered the sweetest and has been tested to be approximately 300 times sweeter than sugar. Stevioside, comprising 6-18% of the *stevia* leaf, is also the most prevalent glycoside in the leaf. Other sweet constituents include steviolbioside, rebaudiosides A-E, and dulcoside A.

The main plant chemicals in *stevia* include: apigenin, austroinulin, avicularin, beta-sitosterol, caffeic acid, campesterol, caryophyllene, centaureidin, chlorogenic acid, chlorophyll, cosmosiin, cynaroside, daucosterol, diterpene glycosides, dulcosides A-B, foeniculin, formic acid, gibberellic acid, gibberellin, indole-3-acetonitrile, isoquercitrin, isosteviol, jhanol, kaempferol, kaurene, lupeol, luteolin, polystachoside, quercetin, quercitrin, rebaudioside A-F, scopoletin, sterebin A-H, steviol, steviolbioside, steviolmonoside, stevioside, stevioside a-3, stigmasterol, umbelliferone, and xanthophylls.

*Stevia* extracts generally contain a high percentage of the glycosides of the diterpene steviol. The leaves of *stevia rebaudiana* contain 10 different steviol glycosides. Steviol glycosides are considered high intensity sweeteners (about 250-300 times that of sucrose) and have been used for several years in a number of countries as a sweetener for a range of food products. Stevioside and rebaudioside A are the principal sweetening compounds and generally accompanied by smaller amounts of other steviol glycosides. The taste quality of rebaudioside A is better than stevioside, because of increased sweetness and decreased bitterness (Phytochemistry 68, 2007, 1855-1863).

The structures and chemical abstract service registry numbers for steviol and its glycosides that are the main sweetening agents of the additive steviol glycosides are shown below:

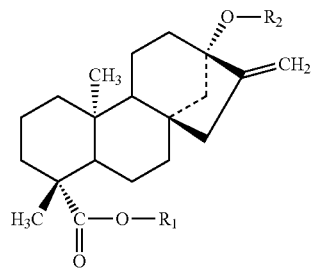

| Compound name | C.A.S. No. | $R_1$ | $R_2$ |
|---|---|---|---|
| 1 Steviol | 471-80-7 | H | H |
| 2 Steviolbioside | 41093-60-1 | H | β-Glc-β-Glc(2→1) |
| 3 Stevioside | 57817-89-7 | β-Glc | β-Glc-β-Glc(2→1) |
| 4 Rebaudioside A | 58543-16-1 | β-Glc | β-Glc-β-Glc(2→1) <br> \| <br> β-Glc(3→1) |
| 5 Rebaudioside B | 58543-17-2 | H | β-Glc-β-Glc(2→1) <br> \| <br> β-Glc(3→1) |
| 6 Rebaudioside C | 63550-99-2 | β-Glc | β-Glc-β-Rha(2→1) <br> \| <br> β-Glc(3→1) |
| 7 Rebaudioside D | 63279-13-0 | β-Glc-β-Glc(2→1) | β-Glc-β-Glc(2→1) <br> \| <br> β-Glc(3→1) |
| 8 Rebaudioside E | 63279-14-1 | β-Glc-β-Glc(2→1) | β-Glc-β-Glc(2→1) |
| 9 Rebaudioside F | 438045-89-7 | β-Glc | β-Glc-β-Xyl(2→1) <br> \| <br> β-Glc(3→1) |
| 10 Rubusoside | 63849-39-4 | β-Glc | β-Glc |
| 11 Dulcoside A | 64432-06-0 | β-Glc | β-Glc-α-Rha(2→1) |

Steviol glycoside preparations are generally white to light yellow powders that are freely soluble in water and ethanol. The powders can be odorless or have a slight characteristic odor. Aqueous solutions are 200 to 300 times sweeter than sucrose under identical conditions. With its extracts having up to 300 times the sweetness of sugar, *stevia* has garnered attention with the rise in demand for low-carbohydrate, low-sugar food alternatives.

Medical research has also shown possible benefits of *stevia* in treating obesity and high blood pressure. Because *stevia* has a negligible effect on blood glucose, it is attractive as a natural sweetener to people on carbohydrate-controlled diets.

As a sweetener and sugar substitute, rebaudioside A has a slower onset and longer duration than that of sugar, and be deemed very close to sucrose, although some of its extracts may have a bitter or licorice-like aftertaste at high concentrations. All steviol glycosides are bitter, some in less degree and some in greater degree.

Therefore, a need exists for a sweetener that overcomes one or more of the current disadvantages noted above.

BRIEF SUMMARY OF THE INVENTION

The present invention surprisingly provides the ability to mask, decrease or eliminate bitterness in an otherwise sweet composition. In particular, compositions that contain steviol glycosides typically have a bitter aftertaste. The improved taste of the compositions of the invention are based, in part, by the reduction or elimination of rebaudioside C or dulcoside A or both from the *stevia* composition.

It has been surprisingly found that the reduction or elimination of rebaudioside C, dulcoside A, or both from stevia compositions, such as from stevia extracts, overcomes, decreases, eliminates or masks the aftertaste associated with stevia, such as rebaudioside A.

Accordingly, compositions with reduced or non-existent amount(s) of rebaudioside C, dulcoside A, or both and methods to prepare such stevia compositions devoid of or with reduced concentrations of rebaudioside C, dulcoside A, or both are provided herein.

Up until the time of the present disclosure, it had not been appreciated that the elimination or reduction of rebaudioside C, dulcoside A, or both could overcome the aftertaste effects of steviol glycosides, such as rebaudioside A. Rebaudioside A is a major component of stevia extracts. Up until the present invention, the focus of research in stevia sweetener preparations has been to produce, isolate and purify rebaudioside A. There has been no appreciation that taking the approach taken herein that the removal of RC and/or dulcoside A would have such a dramatic effect on the reduction of aftertaste of stevia while still retaining increased sweetness (as compared to sugar or other readily available artificial or natural sweeteners).

Additionally, the focus on the preparation and purification of RA leads to increased costs for stevia based sweeteners. In the quest to produce RA of higher purities and via different extraction/isolation methods, the concept to produce acceptable stevia based sweeteners that could contain other components has been neglected. The inventor has taken advantage of this. By refocusing the objective to provide a stevia based sweetener that does not require pure RA, the inventor has found a more economical and efficient way to provide a stevia based sweetener at reduced cost while providing an improved taste profile versus stevia extracts. This unappreciated approach thus provides the presently claimed invention where the focus is not directed to providing pure RA, but stevia based sweeteners with acceptable amounts of stevia glycosides that are minimized to an extent that reduces or eliminates the aftertaste or bitterness typically associated with stevia extracts and, more particularly, with purified RA.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

DETAILED DESCRIPTION

In the specification and in the claims, the terms "including" and "comprising" are open-ended terms and should be interpreted to mean "including, but not limited to . . . ." These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

The phrase "steviol glycosides" is recognized in the art and is intended to include the major and minor constituents of stevia. These include, but are not limited to components of stevia such as Steviol, Steviolbioside, Stevioside, Rebaudioside A (RA), Rebaudioside B (RB), Rebaudioside C (RC), Rebaudioside D (RD), Rebaudioside E (RE), Rebaudioside F (RF), Rubusoside and Dulcoside A (DA). Typically, stevia contains less than about 1 to about 2 percent by weight of rebaudioside C and less than about 0.4 to about 0.7 percent by weight of dulcoside A. As a consequence, it is quite surprising, unappreciated, and unpredicted that removal or reduction of either or both of these components from stevia could overcome the aftertaste of the components of stevia extracts.

The phrase "stevia containing sweetener" is intended to include any composition that is prepared from a stevia plant, such as a stevia extract, or the individual components found in stevia. The sweetener can include one or more of the components associated with the stevia plant, such as those noted above. Again, stevia containing sweeteners generally contain less than about 10 percent by weight of RC and less than about 5 percent by weight of DA. Stevia containing sweeteners generally contain less than 0.1% by weight of RD.

A "stevia composition" as referred to herein, pertains to a material that includes one or more steviol glycosides found in the stevia plant but has less than about 0.2% by weight of RC and/or DA based on the total weight of the material. In particular, the material has less than about 0.1% by weight of RC and/or DA, more particularly the material is devoid of RC and/or DA or the amount of RC and/or DA is not detectable by HPLC methods.

In particular, the present invention provides stevia compositions that are enriched with steviol glycosides other than RC, DA or both, so as to reduce or eliminate or mask the after taste of typical steviol glycoside composition. The stevia compositions of the invention, therefore, provide a sweetener that has an after taste that is reduced, eliminated or is imperceptible by an individual tasting the stevia composition.

In one embodiment, stevia compositions that are enriched with RD in amounts that mask or alter the taste of steviol glycosides, RA in particular, such that the aftertaste associated with steviol glycosides, such as RA, is reduced, eliminated or is imperceptible by an individual tasting the composition. A suitable ratio (by weight basis) is from about 0.01% to about 35%, with the remainder being RA. In one aspect, the percentage is about 70/30 RA/RD by weight.

In still another aspect, the RA/RD mixture can further include RB. RB can be substituted for RD in the mixture and can be present in an amount of up to 50 weight percent. Therefore, an RA/RB mixture can comprise from about 0.5 weight percent RB and 95.5 weight percent RA to about a 50/50 mixture by weight. Suitable ranges of RA to RB include 95:5, 90:10, 85:15, 80:20, 75:25, 70:30, 65:35, 60:40, 55:45, 50:50 and all amounts/ratios there between.

It should be understood that RB can substitute for RD in the compositions of the invention. It should also be understood that not all RD be replaced by RB and vice versa. It should further be understood that all RD can be replaced by RB as well as about 20 weight percent of RA in a composition such that at the composition has at least 50:50 RA/RB present. However, the composition can further contain RD (without detectable amounts of steviol glycosides being present), such that ratios of RA/RD/RB 50:1:49, 50:2:48, 50:3:47, etc. to 65:35:0, 70:30:0, 75:25:0, 80:20:0, 85:15:0 are included with a lower limit of 50 weight percent of RA being present.

Thus, it has been found that purified steviol glycosides, when combined in proper proportions, can provide a sweet tasting composition without the disadvantages of naturally occurring stevia products. For example, purified RA is combined with purified RD, such that other steviol glycosides (e.g., RC, DA) are not present in the composition. Purified RB can also be present.

After a series of studies on steviol glycosides, the researchers of the present invention have discovered that the reduction or removal of RC and/or DA from stevia compositions, as described herein, provides a sweetener with enhanced sweetness without the typical bitterness or aftertaste associated with stevia products.

As a sweetener, sweet taste acceptance determines market value. Due to the decrease in the amount of RC and/or DA present in a stevia composition, the objectionable aftertaste is overcome. Sweetness is related to taste sensitivity. The ability to provide stevia compositions with decreased amounts of RC and/or DA (or devoid of RC and/or DA) on an industrial scale will provide the opportunity to use these modified stevia sweeteners as a significant sugar substitute.

Stevia compositions with reduced or eliminated RC and/or DA content can be obtained from the stevia plant by recrystallization techniques or can be purchased from commercial sources. For example, Ningbo Green-Health Pharmaceutical Co., Ltd. provides purified RA and stevioside.

The researchers of this invention found the decreasing the content of rebaudioside C and/or dulcoside A in a food or beverage can improve the aftertaste, e.g., it is more similar to sucrose and has a less bitter aftertaste that stevia containing products (e.g., compositions containing steviol glycosides) that contains rebaudioside C and/or dulcoside A.

It has been found that reduction of the total weight percentage of RC and/or DA below about 0.2 weight percent in a stevia composition reduces or eliminates the bitterness or after taste typically associated with stevia products. In one aspect, the reduction of the total content of RC and/or DA below about 0.1 weight percent (of the total weight percentage of the stevia composition) eliminates or reduces the bitterness or aftertaste. More particularly, reduction of RC and/or DA below about 0.09%, 0.08%, 0.07%, 0.06%, 0.05%, 0.04%, 0.03%, 0.02%, 0.01% or less helps to decrease the bitterness and/or aftertaste typically associated with stevia compositions. In one particular aspect, RC and/or DA are not present. In another aspect, RC and/or DA are not detectable by HPLC analysis.

In one aspect, the stevia composition includes the naturally occurring components of the stevia plant with less than about 0.2 weight percent (or less) of rebaudioside C or dulcoside A or both of the composition.

In another aspect, the stevia composition includes stevioside and rebaudioside B, provided less than about 0.2 weight percent (or less) of rebaudioside C or dulcoside A or both are present in the composition.

In still another aspect, the stevia composition includes rebaudioside B and either rebaudioside A or rebaudioside D or both, provided less than about 0.2 weight percent (or less) of rebaudioside C or dulcoside A or both are present in the composition.

In yet another aspect, the stevia composition includes stevioside and either rebaudioside A or rebaudioside D or both, provided less than about 0.2 weight percent (or less) of rebaudioside C or dulcoside A or both are present in the composition.

In still yet another aspect, the stevia composition includes rebaudioside A and rebaudioside D or both, provided less than about 0.2 weight percent (or less) of rebaudioside C or dulcoside A or both are present in the composition.

The present invention also provides a purified RA composition that is enriched in purified rebaudioside D. The content of RD in the composition is generally greater than about 0.5% by weight relative to the amount found in a naturally occurring stevia source, a stevia extract, a food, or a sweetener. It has been found that inclusion of up to 35 weight percent of purified RD in combination with purified RA, as the remainder, provides a desirable product without aftertaste or bitterness. Typical stevia sweeteners or extracts contain greater than 99% by weight rebaudioside A and trace amounts of remaining steviol glycosides or other components, such as cellulose and the like.

In another aspect, the composition comprises about 99.5% by weight RA and at least about 0.5% RD. It has been found that having at least about 0.5% RD in such a composition masks or eliminates the aftertaste of the RA.

It should be understood that "pure" steviol glycosides, such as RA, RD and RB have a purity as measured by HPLC wherein the purity is at least 97%. The remaining 3% does not include RC or dulcoside A. (Purified RA, RB and RD are available from Zhejiang Green World Bio-Tech Engineering Co., Ltd.)

After a series of studies on steviol glycosides, the researchers of the present invention have discovered that the taste sensitivity of rebaudioside D is closer to sucrose than rebaudioside A. All steviol glycosides have bitter aftertaste but it has been discovered that a range of up to 35 weight percent RD in an RA composition masks the bitterness and/or the licorice aftertaste. Preferably, the RA and RD are purified prior to preparation of the composition. RD either decreases the aftertaste to a point that it is markedly decreased (versus a sample that is not enriched with the RD at a level of at least about 30% RD over the control sample) or to a point that it is imperceptible to the individual.

As a sweetener, sweet taste acceptance determines market value. Due to the increase in the amount of rebaudioside D present in a stevia composition overcomes objectionable aftertaste. Sweetness is related to taste sensitivity.

It has been found that generally, above about 0.5% to about 35% by weight of RD in an RA/RD composition (preferably wherein the RA and RD are purified), with respect to the overall weight of an RA sweetener, can bring better taste when eating or drinking.

In one aspect, the weight percent of rebaudioside A to rebaudioside D is 65:35, 70:30, 75:25, 80:20, 85:15 by weight in a composition and all amounts/ratio there between. The composition can be a combination of RA and RD alone or in combination with a food product and preferably the RA, RD and/or RB are all purified prior to combining. RB can be included in the composition as a percent substitution for RD. As noted above, a suitable ratio of RA/RB/RD is 70/15/15.

In another aspect, the invention provides a stevia composition comprising from about 98.5 to about 97.5 weight percent of rebaudioside A and from about 1.5 to about 2.5 weight percent of rebaudioside D. The composition can be a combination of RA and RD alone or in combination with a food product.

In still another aspect, the present invention provides a *stevia* composition wherein the weight percent of rebaudioside A to rebaudioside D is 98.5:1.5, 98:2 or 97.5:2.5 by weight. The composition can be a combination of RA and RD alone or in combination with a food product.

The following 10 formulations provide suitable combinations and ranges of materials that are encompassed within the present invention. Such combinations provide *stevia* based sweeteners that do not have the bitterness or aftertaste associated with purified RA or typical *stevia* extracts that are used as sweeteners. Each of the components have a purity (by HPLC) of at least 95%.

(1) Reb D+Reb A+stevioside+rebaudioside B
Reb D: 0.01-5%
Reb A: 0.01-99.97%
Stevioside: 0.01-99.97%
rebaudioside B: 0.01-5%
RC/DA: 0-0.02%
(2) Reb D+Reb A+stevioside
Reb D: 0.01-5%
Reb A: 0.01-99.98%
Stevioside: 0.01-99.98%
RC/DA: 0-0.02%
(3) Reb D+Reb A+rebaudioside B
Reb D: 0.01-5%
Reb A: 89.98-99.98%
rebaudioside B: 0.01-5%
RC/DA: 0-0.02%
(4) Reb D+stevioside+rebaudioside B
Reb D: 0.01-5%
Stevioside: 89.98-99.98%
rebaudioside B: 0.01-5%
RC/DA: 0-0.02%
(5) Reb A+stevioside+rebaudioside B
Reb A: 0.01-99.98%
Stevioside: 0.01-99.98%
rebaudioside B: 0.01-5%
RC/DA: 0-0.02%
(6) Reb D+Reb A
Reb D: 0.01-5%
Reb A: 94.98-99.99%
RC/DA: 0-0.02%
(7) Reb D+stevioside
Reb D: 0.01-5%
Stevioside: 94.98-99.99%
RC/DA: 0-0.02%
(8) Reb A+stevioside
Reb A: 0.01-99.99%
Stevioside: 0.01-99.99%
RC/DA: 0-0.02%
(9) Reb A+rebaudioside B
Reb A: 94.98-99.99%
rebaudioside B: 0.01-5%
RC/DA: 0-0.02%
(10) stevioside+rebaudioside B
Stevioside: 94.98-99.99%
rebaudioside B: 0.01-5%
RC/DA: 0-0.02%

The *stevia* compositions noted herein can be used as a sugar substitute alone or in combination with a food product.

The *stevia* compositions noted herein can be used in beverages, broths, and beverage preparations selected from the group comprising carbonated, non-carbonated, frozen, semi-frozen ("slush"), non-frozen, ready-to-drink, concentrated (powdered, frozen, or syrup), dairy, non-dairy, herbal, non-herbal, caffeinated, non-caffeinated, alcoholic, non-alcoholic, flavored, non-flavored, vegetable-based, fruit-based, root/tuber/corm-based, nut-based, other plant-based, cola-based, chocolate-based, meat-based, seafood-based, other animal-based, algae-based, calorie enhanced, calorie-reduced, and calorie-free products, optionally dispensed in open containers, cans, bottles or other packaging. Such beverages and beverage preparations can be in ready-to-drink, ready-to-cook, ready-to-mix, raw, or ingredient form and can use the *stevia* composition as a sole sweetener or as a co-sweetener.

The *stevia* compositions noted herein can be used in foods and food preparations (e.g. sweeteners, soups, sauces, flavorings, spices, oils, fats, and condiments) from dairy-based, cereal-based, baked, vegetable-based, fruit-based, root/tuber/corm-based, nut-based, other plant-based, egg-based, meat-based, seafood-based, other animal-based, algae-based, processed (e.g. spreads), preserved (e.g. meals-ready-to-eat rations), and synthesized (e.g. gels) products. Such foods and food preparations can be in ready-to-eat, ready-to-cook, ready-to-mix, raw, or ingredient form and can use the *stevia* compositions as a sole sweetener or as a co-sweetener.

The *stevia* compositions noted herein can be used in candies, confections, desserts, and snacks selected from the group comprising dairy-based, cereal-based, baked, vegetable-based, fruit-based, root/tuber/corm-based, nut-based, gum-based, other plant-based, egg-based, meat-based, seafood-based, other animal-based, algae-based, processed (e.g. spreads), preserved (e.g. meals-ready-to-eat rations), and synthesized (e.g. gels) products. Such candies, confections, desserts, and snacks can be in ready-to-eat, ready-to-cook, ready-to-mix, raw, or ingredient form, and can use the *stevia* compositions as a sole sweetener or as a co-sweetener.

The *stevia* compositions noted herein can be used in prescription and over-the-counter pharmaceuticals, assays, diagnostic kits, and therapies selected from the group comprising weight control, nutritional supplement, vitamins, infant diet, diabetic diet, athlete diet, geriatric diet, low carbohydrate diet, low fat diet, low protein diet, high carbohydrate diet, high fat diet, high protein diet, low calorie diet, non-caloric diet, oral hygiene products (e.g. toothpaste, mouthwash, rinses, floss, toothbrushes, other implements), personal care products (e.g. soaps, shampoos, rinses, lotions, balms, salves, ointments, paper goods, perfumes, lipstick, other cosmetics), professional dentistry products in which taste or smell is a factor (e.g. liquids, chewables, inhalables, injectables, salves, resins, rinses, pads, floss, implements), medical, veterinarian, and surgical products in which taste or smell is a factor (e.g. liquids, chewables, inhalables, injectables, salves, resins, rinses, pads, floss, implements), and pharmaceutical compounding fillers, syrups, capsules, gels, and coating products.

The *stevia* compositions noted herein can be used in consumer goods packaging materials and containers selected from the group comprising plastic film, thermoset and thermoplastic resin, gum, foil, paper, bottle, box, ink, paint, adhesive, and packaging coating products.

The *stevia* compositions noted herein can be used in goods including sweeteners, co-sweeteners, coated sweetener sticks, frozen confection sticks, medicine spoons (human and veterinary uses), dental instruments, pre-sweetened disposable tableware and utensils, sachets, edible sachets, potpourris, edible potpourris, artificial flowers, edible artificial flowers, clothing, edible clothing, massage oils, and edible massage oils.

The *stevia* compositions can also be used with "artificial sweeteners". Artificial sweeteners are those, other than sucrose, such as cyclamates and salts thereof, sucralose, aspartame, saccharin and salts thereof, *stevia* (Truvia™), rebaudioside A, xylitol, acesulfame-K, neotame, N-4N-[3-(3-hydroxy-4-methoxyphenyl)propyl]-alpha-aspartyl]-L-phenylalanine 1-methyl ester (hereinafter abbreviated as "ANS9801"), glycyrrhizin, thaumatin, monellin and the like. The *stevia* compositions noted herein masks, reduces or eliminates the aftertaste associated with the artificial sweetener, such that the taste of like that of sugar.

The following paragraphs enumerated consecutively from 1 through 62 provide for various aspects of the present invention. In one embodiment, in a first paragraph (1), the present invention provides a *stevia* composition comprising the naturally occurring sweet tasting components of the *stevia* plant with less than about 0.2 weight percent of rebaudioside C or dulcoside A or both of the composition.

2. The *stevia* composition of paragraph 1, wherein rebaudioside C or dulcoside A or both are present in an amount of less than about 0.1 weight percent of the composition.

3. The *stevia* composition of paragraph 1, wherein rebaudioside C or dulcoside A or both are not present in the composition.

4. The *stevia* composition of paragraph 1, wherein rebaudioside C or dulcoside A or both are not detectable by HPLC.

5. A *stevia* composition comprising stevioside and rebaudioside B, provided less than about 0.2 weight percent of rebaudioside C or dulcoside A or both are present in the composition.

6. The *stevia* composition of paragraph 5, wherein the stevioside is present in the composition in a range of from about 95 percent to about 99.7 percent on a weight basis.

7. The *stevia* composition of paragraph 5, wherein the rebaudioside B is present in the composition in a range of from about 0.01 percent to about 4.98 percent on a weight basis.

8. The *stevia* composition of any of paragraphs 5 through 7, further comprising rebaudioside A.

9. The *stevia* composition of paragraph 8, wherein the rebaudioside A is present in the composition in a range of from about 0.01 percent to about 99.98 percent on a weight basis.

10. The *stevia* composition of any of paragraphs 5 through 7, further comprising rebaudioside D.

11. The *stevia* composition of paragraph 8, wherein the rebaudioside D is present in the composition in a range of from about 0.01 percent to about 4.98 percent on a weight basis.

12. The *stevia* composition of any of paragraphs 5 through 7, further comprising rebaudioside A and rebaudioside D.

13. The *stevia* composition of paragraph 8, wherein the combination of rebaudioside A and rebaudioside D is present in the composition in a range of from about 0.01 percent to about 5 percent on a weight basis.

14. The *stevia* composition of any of paragraphs 5 through 13, wherein rebaudioside C or dulcoside A or both are present in an amount of less than about 0.1 weight percent of the composition.

15. The *stevia* composition of any of paragraphs 5 through 13, wherein rebaudioside C or dulcoside A or both are not present in the composition.

16. The *stevia* composition of any of paragraphs 5 through 13, wherein rebaudioside C or dulcoside A or both are not detectable by HPLC.

17. A *stevia* composition comprising rebaudioside B and either rebaudioside A or rebaudioside D, provided less than about 0.2 weight percent of rebaudioside C or dulcoside A or both are present in the composition.

18. The *stevia* composition of paragraph 17, wherein the rebaudioside B is present in the composition in a range of from about 0.01 percent to about 4.98 percent on a weight basis.

19. The *stevia* composition of paragraph 17, wherein the rebaudioside A is present in the composition in a range of from about 95 percent to about 99.97 percent on a weight basis.

20. The *stevia* composition of paragraph 17, wherein the rebaudioside D is present in the composition in a range of from about 0 percent to about 5 percent on a weight basis.

21. The *stevia* composition of 17, wherein both rebaudioside A and rebaudioside D are present.

22. The *stevia* composition of paragraph 21, wherein the combination of rebaudioside A and rebaudioside D is present in the composition in a range of from about 0.01 percent to about 5 percent on a weight basis.

23. The *stevia* composition of any of paragraphs 17 through 22, wherein rebaudioside C or dulcoside A or both are present in an amount of less than about 0.1 weight percent of the composition.

24. The *stevia* composition of any of paragraphs 17 through 22, wherein rebaudioside C or dulcoside A or both are not present in the composition.

25. The *stevia* composition of any of paragraphs 17 through 22, wherein rebaudioside C or dulcoside A or both are not detectable by HPLC.

26. A *stevia* composition comprising stevioside and either rebaudioside A or rebaudioside D, provided less than about 0.2 weight percent of rebaudioside C or dulcoside A or both are present in the composition.

27. The *stevia* composition of paragraph 26, wherein the stevioside is present in the composition in a range of from about 0.01 percent to about 99.7 percent on a weight basis.

28. The *stevia* composition of paragraph 26, wherein the rebaudioside A is present in the composition in a range of from about 0.01 percent to about 99.7 percent on a weight basis.

29. The *stevia* composition of paragraph 26, wherein the rebaudioside D is present in the composition in a range of from about 0 percent to about 5 percent on a weight basis.

30. The *stevia* composition of 26, wherein both rebaudioside A and rebaudioside D are present.

31. The *stevia* composition of paragraph 30, wherein the combination of rebaudioside A and rebaudioside D is present in the composition in a range of from about 0.01 percent to about 5 percent on a weight basis.

32. The *stevia* composition of any of paragraphs 26 through 31, wherein rebaudioside C or dulcoside A or both are present in an amount of less than about 0.1 weight percent of the composition.

33. The *stevia* composition of any of paragraphs 26 through 31, wherein rebaudioside C or dulcoside A or both are not present in the composition.

34. The *stevia* composition of any of paragraphs 26 through 31, wherein rebaudioside C or dulcoside A or both are not detectable by HPLC.

35. A *stevia* composition comprising rebaudioside A and rebaudioside D, provided less than about 0.2 weight percent of rebaudioside C or dulcoside A or both are present in the composition.

36. The *stevia* composition of paragraph 35, wherein the rebaudioside A is present in the composition in a range of from about 95 percent to about 99.97 percent on a weight basis.

37. The *stevia* composition of paragraph 35, wherein the rebaudioside D is present in the composition in a range of from about 0.01 percent to about 4.98 percent on a weight basis.

38. The *stevia* composition of paragraph 35, wherein the combination of rebaudioside A is present in the composition in a range of from about 94.98 percent to about 99.99 percent and rebaudioside D is present in the composition in a range of from about 0.01 percent to about 5 percent on a weight basis.

39. The *stevia* composition of any of paragraphs 35 through 38, wherein rebaudioside C or dulcoside A or both are present in an amount of less than about 0.1 weight percent of the composition.

40. The *stevia* composition of any of paragraphs 35 through 38, wherein rebaudioside C or dulcoside A or both are not present in the composition.

41. The *stevia* composition of any of paragraphs 35 through 38, wherein rebaudioside C or dulcoside A or both are not detectable by HPLC.

42. The *stevia* composition of any of paragraphs 1 through 41, further comprising one or more of rebaudioside B, rebaudioside E, rebaudioside F, steviol or rebusoside.

43. A composition comprising rebaudioside A (RA) and rebaudioside D (RD), wherein RA is present from about 95% to about 65% by weight and RD is present from about 5% to about 35% by weight, provided other steviol glycosides, except for rebaudioside B, are not present in detectable amounts.

44. The composition of paragraph 43, wherein the RA, RD and/or RB are purified.

45. The composition of paragraph 43, wherein RB is present in an amount of 0.5 to about 30 percent by weight.

46. The composition of paragraph 43, wherein the other steviol glycosides are less than 0.5% of the total composition.

47. The composition of paragraph 43, wherein the other steviol glycosides are less than 0.2% of the total composition.

48. The composition of paragraph 43, wherein the other steviol glycosides are less than 0.1% of the total composition.

49. The composition of paragraph 43, wherein the other steviol glycosides are less than 0.05% of the total composition.

50. The composition of paragraph 43, wherein the other steviol glycosides are less than 0.01% of the total composition.

51. The composition of paragraph 43, wherein RA, RD and RB are purified and are present in a 70/15/15 ratio.

52. The composition of paragraph 51, wherein the other steviol glycosides are less than 0.5% of the total composition.

53. The composition of paragraph 51, wherein the other steviol glycosides are less than 0.2% of the total composition.

54. The composition of paragraph 51, wherein the other steviol glycosides are less than 0.1% of the total composition.

55. The composition of paragraph 51, wherein the other steviol glycosides are less than 0.05% of the total composition.

56. The composition of paragraph 51, wherein the other steviol glycosides are less than 0.01% of the total composition.

57. The composition of paragraph 43, wherein RA and RD are purified and are present in a 70/30 ratio.

58. The composition of paragraph 57, wherein the other steviol glycosides are less than 0.5% of the total composition.

59. The composition of paragraph 57, wherein the other steviol glycosides are less than 0.2% of the total composition.

60. The composition of paragraph 57, wherein the other steviol glycosides are less than 0.1% of the total composition.

61. The composition of paragraph 57, wherein the other steviol glycosides are less than 0.05% of the total composition.

62. The composition of paragraph 57, wherein the other steviol glycosides are less than 0.01% of the total composition.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

EXAMPLES

HPLC Conditions:
Column: Angilent Zorbax $NH_2$ (5 μm, 4.6 mm×150 mm)
Temperature: Ambient
Flow: 1 mL/min
Injection Volume: 104
Detector: UV Detector
Wavelength: 210 nm
Mobile Phase: Acetonitrile-$H_2O$=75:25
Comparison of taste improvement
Sample Preparation:

| Sample No. | Sample description |
| --- | --- |
| 1 | Reb A (purity 99% by HPLC, RC and DA not detectable by HPLC) was added to water and a solution was formed. Concentration of total steviol glycosides is 0.02%. |
| 2 | Reb A (purity 97% by HPLC, RC and DA not detectable by HPLC) and rebaudioside B (purity 99% by HPLC, RC and DA not detectable by HPLC) were added to water to form a solution. Reb A/rebaudioside B by weight is 9:1. Concentration of total steviol glycosides is 0.02%. |
| 3 | Stevioside (purity 98% by HPLC, RC and DA not detectable by HPLC) was added to water and a solution was formed. Concentration of total steviol glycosides is 0.02%. |
| 4 | Stevioside (purity 98% by HPLC, RC and DA not detectable by HPLC) and rebaudioside B (purity 99% by HPLC, RC and DA not detectable by HPLC) were added to water to form a solution. stevioside/rebaudioside B by weight is 9:1. Concentration of total steviol glycosides is 0.02%. |

Procedure:
An expert sensory panel taste sampled 1 and 2, and provided their impression as to the similarities/differences of the characteristics (Characteristics include maximal response, flavor profile, temporal profile, adaptation behavior, mouthfeel, concentration/response function, and flavor/sweet taste interactions, spatial pattern selectivity, and temperature effects) of each sample. The panel of assessors used the Spectrum™ Descriptive Analysis Method (Meilgaard et al, Sensory Evaluation Techniques, $3^{rd}$ edition, Chapter 11).

In order to ensure accuracy and reproducibility of results, each assessor repeated the measure of the reduction of sweetness lingering about three to about five times per sample, taking at least a five minute break between each repetition and/or sample and rinsing well with water to clear the mouth.

The method of measuring sweetness comprised taking a 10 mL sample into the mouth, holding the sample in the mouth for 5 seconds and gently swirling the sample in the mouth, rating the sweetness intensity perceived at 5 seconds, expectorating the sample (without swallowing following expectorating the sample), rinsing with one mouthful of water (e.g., vigorously moving water in mouth as if with mouth wash) and expectorating the rinse water, rating the sweetness intensity perceived immediately upon expectorating the rinse water, waiting 45 seconds and, while waiting those 45 seconds, identifying the time of maximum perceived sweetness intensity and rating the sweetness intensity at that time (moving the mouth normally and swallowing as needed), rating the sweetness intensity after another 10 seconds, rating the sweetness intensity after another 60 seconds (cumulative 120 seconds after rinse), and rating the sweetness intensity after still another 60 seconds (cumulative 180 seconds after rinse). Between samples a 5 minute break was taken, rinsing well with water to clear the mouth.

Using statistical analysis, the results were compared between samples. A decrease in score for a time point measured after the sample has cleared the mouth indicates there has been a reduction in sweetness perception.

Result:

Samples 1 and 2 were administered to 11 subjects. 10 of the subjects thought the bitter aftertaste of sample 2 was less than sample 1.

Samples 3 and 4 were administered to 10 subjects. 8 of the subjects thought sample 4 had a slighter aftertaste more than sample 3.

Sample Preparation:

Raw Material:

99% rebaudioside A by HPLC, RC and DA not detectable by HPLC, purity 99% stevioside by HPLC, RC and DA not detectable by HPLC, 99% (supplied by ChrimaDex) by HPLC, rebaudioside C Sample A:

Was an aqueous solution of rebaudioside A and stevioside, reb A/stevioside=85.6/9.5 relative weight ratio, concentration is 0.02%, reb C is undetectable.

Sample B:

Rebaudioside C was added to sample A to form a solution with 0.02% concentration of RA and stevioside; Reb C/(reb A+stevioside+reb C)=0.02%.

Sample C:

Rebaudioside C was added to sample A to form a solution with 0.02% concentration of total steviol glycosides (RC+stevioside+RA); Reb C/(reb A+stevioside+reb C)=0.04%.

Eight subjects tasted each sample. The results are provided below:

6 of 8 subjects thought there was no difference between sample B and sample A, and 2 of 8 subjects thought sample B was not better than sample A.

2 of 8 subjects thought there was no differences between sample C and sample A, and 6 of 8 subjects thought that sample C was not better than sample A and B.

CONCLUSION

As for aqueous solution of reb A and stevioside, if reb C is below 0.02% of total steviol glycosides, then there was no impact on human sense (taste).

Using the same tasting procedures, three additional samples were prepared and tested. Aqueous samples of RA/RD were prepared by adding an amount RA, RB and/of RD to water to provide 400 ppm of the rebaudioside composition as an aqueous solution. As such 70/30, 85/15 and 80/20 ratios of RA/RD were obtained. The RA/RD sample of 70/30 was the best tasting without a slow onset of aftertaste. The RA/RD sample of 85/15 was acceptable but had a small amount of bitterness. The RA/RD sample of 80/20 was acceptable but had an increased amount of bitterness.

Again, using the same tasting procedures, samples of RA/RD/RB were tested, were RB was increased to replace RD. It was found that a sample of RA/RD/RB having a ratio of 70/15/15 was the most accepted without any aftertaste. The 70/15/15 RA/RD/RB sample has a better taste than the 85/15 RA/RD sample and did not have an aftertaste.

Although the present invention has been described with reference to preferred embodiments, persons skilled in the art will recognize that changes may be made in form and detail without departing from the spirit and scope of the invention. All references cited throughout the specification, including those in the background, are incorporated herein in their entirety. Those skilled in the art will recognize, or be able to ascertain, using no more than routine experimentation, many equivalents to specific embodiments of the invention described specifically herein. Such equivalents are intended to be encompassed in the scope of the following claims.

What is claimed is:

1. A *stevia* composition comprising:
rebaudioside A (RA) and rebaudioside D (RD), wherein RA is present in an amount of about 95% to about 65% by weight of the *stevia* composition and RD is present in an amount of about 5% to about 35% by weight of the *stevia* composition.

2. The *stevia* composition of claim 1, wherein the *stevia* composition further comprises rebaudioside B (RB).

3. The *stevia* composition of claim 1, wherein the *stevia* composition further comprises stevioside.

4. The *stevia* composition of claim 1, wherein the *stevia* composition further comprises steviobioside.

5. A food or food preparation, comprising the *stevia* composition of claim 1.

6. The food or food preparation of claim 5, wherein the *stevia* composition further comprises RB.

7. The food or food preparation of claim 5, wherein the *stevia* composition further comprises stevioside.

8. The food or food preparation of claim 5, wherein the *stevia* composition further comprises steviobioside.

9. A pharmaceutical composition, comprising the *stevia* composition of claim 1.

10. The pharmaceutical composition of claim 9, wherein the *stevia* composition further comprises RB.

11. The pharmaceutical composition of claim 9, wherein the *stevia* composition further comprises stevioside.

12. The pharmaceutical composition of claim 9, wherein the *stevia* composition further comprises steviobioside.

13. A beverage, comprising the *stevia* composition of claim 1.

14. The beverage of claim 13, wherein the *stevia* composition further comprises RB.

15. The beverage of claim 13, wherein the *stevia* composition further comprises stevioside.

16. The beverage of claim 13, wherein the *stevia* composition further comprises steviobioside.

17. A method for improving a taste profile of RA in a *stevia* composition comprising RA, the method comprises the step of:
   adding RD to the *stevia* composition such that RA is present in an amount of about 95% to about 65% by weight of the *stevia* composition and RD is present in an amount of about 5% to about 35% by weight of the *stevia* composition.

18. The method of claim 17, wherein the addition of RD reduces bitterness of RA.

19. The method of claim 17, wherein the addition of RD reduces metallic aftertaste of RA.

20. The method of claim 17, wherein the addition of RD reduces sweet lingering of RA.

\* \* \* \* \*